United States Patent
Gilbert et al.

(10) Patent No.: US 11,439,854 B2
(45) Date of Patent: Sep. 13, 2022

(54) COMMON ARRAY MOUNTING BOTTLES ENGINEERED FOR REUSE

(71) Applicant: THE BOEING COMPANY, Chicago, IL (US)

(72) Inventors: Eric B. Gilbert, Seattle, WA (US); Bennett Keith Olson, Seattle, WA (US); Timothy LeRoy Skilton, Bellevue, WA (US); Robert Steven Wright, Seattle, WA (US)

(73) Assignee: The Boeing Company, Chicago, IL (US)

( * ) Notice: Subject to any disclaimer, the term of this patent is extended or adjusted under 35 U.S.C. 154(b) by 19 days.

(21) Appl. No.: 15/679,606

(22) Filed: Aug. 17, 2017

(65) Prior Publication Data

US 2019/0054332 A1     Feb. 21, 2019

(51) Int. Cl.
*A62C 35/02*     (2006.01)
*A62C 3/08*     (2006.01)
*B64D 45/00*     (2006.01)
*A62C 35/58*     (2006.01)
*A62C 37/36*     (2006.01)
*B64D 27/02*     (2006.01)

(52) U.S. Cl.
CPC ............... *A62C 35/02* (2013.01); *A62C 3/08* (2013.01); *A62C 35/58* (2013.01); *A62C 37/04* (2013.01); *B64D 45/00* (2013.01); *B64D 27/02* (2013.01); *B64D 2045/009* (2013.01)

(58) Field of Classification Search
CPC ........... A62C 35/02; A62C 3/08; A62C 35/58; A62C 37/04; B64D 45/00; B64D 27/02
USPC ............................................................ 169/44
See application file for complete search history.

(56) References Cited

U.S. PATENT DOCUMENTS 2,552,979 A * 5/1951 Kucher .................... A62C 3/08
                                             169/6
3,040,816 A * 6/1962 Slough ................ A62C 13/006
                                             169/9
4,592,301 A * 6/1986 Monte ................ G08B 13/1472
                                             116/162

(Continued)

FOREIGN PATENT DOCUMENTS

CN           209278549      *   8/2019  ............. F16K 11/20

OTHER PUBLICATIONS

Yao et al. Google translated English of CN209278549, 2019. (Year: 2019).*

*Primary Examiner* — Chee-Chong Lee
(74) *Attorney, Agent, or Firm* — Yee & Associates, P.C.

(57) ABSTRACT

A fire extinguisher system. The system includes a first fire extinguisher containing a first agent that is suitable for extinguishing fire, the first fire extinguisher having a first discharge port for discharging the first agent therethrough, and a first actuator for actuating the first discharge port. The system also includes a second, similar fire extinguisher. The system also includes a valve coupled to the first discharge port via a first line and coupled to the second discharge port via a second line, wherein the valve is configured to release the first agent and the second agent into a third line. The system also includes a controller connected to the first actuator and the second actuator, the controller configured to activate the first actuator and the second actuator in a predetermined sequence.

20 Claims, 12 Drawing Sheets

(56) References Cited

U.S. PATENT DOCUMENTS

| | | | | |
|---|---|---|---|---|
| 4,643,260 A | * | 2/1987 | Miller | A62C 3/08 |
| | | | | 169/46 |
| 6,860,333 B2 | | 3/2005 | Laib et al. | |
| 7,353,881 B2 | | 4/2008 | Akins et al. | |
| 7,510,022 B2 | * | 3/2009 | Lazzarini | A62C 3/08 |
| | | | | 169/54 |
| 8,973,670 B2 | * | 3/2015 | Enk, Sr. | A62C 3/08 |
| | | | | 169/14 |
| 9,248,326 B2 | | 2/2016 | Meier et al. | |
| 2010/0193201 A1 | * | 8/2010 | Zeller | B01F 5/0411 |
| | | | | 169/46 |
| 2010/0236796 A1 | * | 9/2010 | Chattaway | A62C 37/44 |
| | | | | 169/46 |
| 2017/0032653 A1 | * | 2/2017 | Crawford | E21B 43/119 |

* cited by examiner

COMMON ARRAY MOUNTING BOTTLES ENGINEERED FOR REUSE

BACKGROUND INFORMATION

1. Field

The present disclosure relates to methods and devices for fire extinguisher systems that rely on multiple fire extinguishers, and in particular, relates to fire extinguisher systems on the engines of jet aircraft.

2. Background

Modern aircraft typically have a fire suppression system installed. In the case of jet aircraft, at least part of the fire suppression system is installed inside of the jet engine itself in order to quickly suppress combustion in the event of a fire.

Many existing fire suppression systems in aircraft have a bottle, filled with a halon liquid, installed in the engine itself. The bottle is sized based on the engine. Thus, existing fire suppression bottles are not standardized across different aircraft and engine manufacturers. Additionally, each bottle stands alone and is configured to discharge into its own discharge zone. Still further, because most halon gasses deplete ozone, halon-based fire suppression systems are being replaced over time. Therefore, a need exists for a scalable fire suppression system solution that replaces current halon-based systems.

SUMMARY

The illustrative embodiments provide for a fire extinguisher system. The system includes a first fire extinguisher containing a first agent that is suitable for extinguishing fire, the first fire extinguisher having a first discharge port for discharging the first agent therethrough, and a first actuator for actuating the first discharge port. The system also includes a second fire extinguisher containing a second agent that is suitable for extinguishing fire, the second fire extinguisher having a second discharge port for discharging the second agent therethrough, and a second actuator for actuating the second discharge port. The system also includes a valve coupled to the first discharge port via a first line and coupled to the second discharge port via a second line, wherein the valve is configured to release the first agent and the second agent into a third line. The system also includes a controller connected to the first actuator and the second actuator, the controller configured to activate the first actuator and the second actuator in a predetermined sequence.

The illustrative embodiments also provide for an aircraft including a fuselage and an engine connected to the fuselage, the engine configured to propel the fuselage. The aircraft further includes a first fire extinguisher containing a first agent that is suitable for extinguishing fire. The first fire extinguisher having a first discharge port for discharging the first agent therethrough, and a first actuator for actuating the first discharge port. The aircraft also includes a second fire extinguisher containing a second agent that is suitable for extinguishing fire. The second fire extinguisher having a second discharge port for discharging the second agent therethrough, and a second actuator for actuating the second discharge port. The aircraft also includes a valve coupled to the first discharge port via a first line and is coupled to the second discharge port via a second line. The valve is configured to release the first agent and the second agent into a third line which terminates in an engine fire zone within the engine. The aircraft also includes a controller connected to the first actuator and the second actuator. The controller is configured to activate the first actuator and the second actuator in a predetermined sequence.

The illustrative embodiments also provide for a method of installing a fire extinguisher system on a platform. The method includes installing, on the platform, a first fire extinguisher containing a first agent that is suitable for extinguishing fire, the first fire extinguisher having a first discharge port for discharging the first agent therethrough, and a first actuator for actuating the first discharge port. The method further includes installing, on the platform, a second fire extinguisher containing a second agent that is suitable for extinguishing fire, the second fire extinguisher having a second discharge port for discharging the second agent therethrough, and a second actuator for actuating the second discharge port. The method further includes installing, on the platform, a valve coupled to the first discharge port via a first line and coupled to the second discharge port via a second line, wherein the valve is configured to release the first agent and the second agent into a third line. The method further includes installing, on the platform, a controller connected to the first actuator and the second actuator, the controller configured to activate the first actuator and the second actuator in a predetermined sequence.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
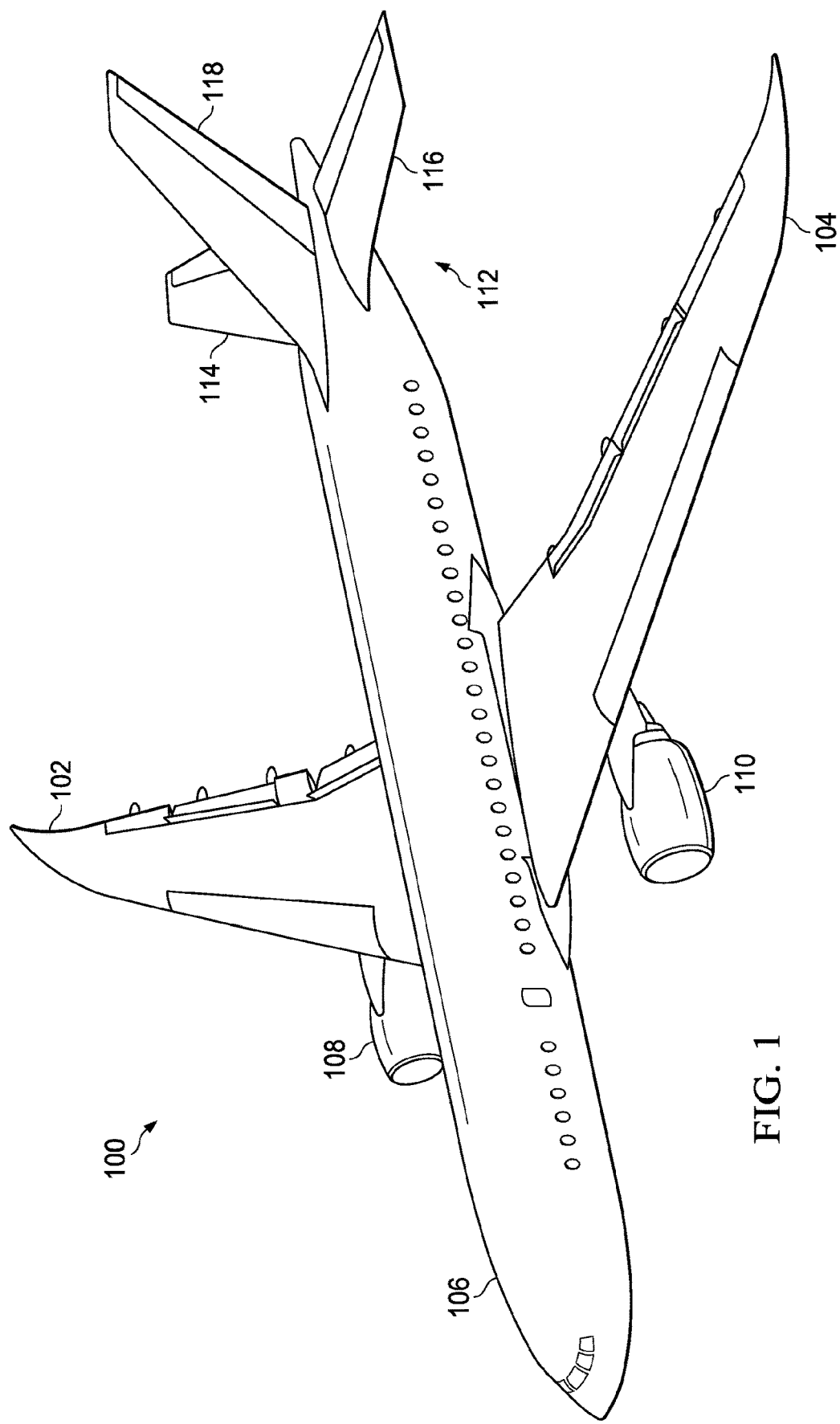
FIG. 1 illustrates an aircraft, in accordance with an illustrative embodiment.

The illustrative embodiments recognize and take into account that, as described above, existing fire prevention solutions have a fire bottle that is sized based on the engine, and thus is not common across different aircraft and engine manufacturers. Current fire bottles use halon, which is being replaced as a fire suppressant since halon depletes ozone. Halon is any number of unreactive gaseous compounds of carbon with bromine and other halogens, used in fire extinguishers, but now known to damage the ozone layer of the Earth.

Additionally, the illustrative embodiments recognize and take into account that a need exists for a solution that allows multiple fire bottles to be used to provide a scalable solution. Thus, the illustrative embodiments provide for a system having a plurality of fire bottles ganged together and a controller that controls the firing sequence to allow the ganged configuration to be practical. The system of the illustrative embodiments uses smaller fire bottles that are common for different platforms and engines. Thus, the illustrative embodiments provide for a number of bottles scaled to the appropriate size for each engine. The controller of the illustrative embodiments allows the system to be practical because the controller sequences the firing to ensure that the actuators that cause a bottle to discharge its contents do not draw too much current from a limited current supply. The controller also performs continuity checks to ensure that each bottle is ready for use.

The illustrative embodiments also provide for a customizable and lower-weight fire suppression system relative to existing halon gas systems. The illustrative embodiments also provide for a reusable system, since the bottles of the illustrative embodiments can be easily replaced during routine maintenance. This replaceability stands in contrast to existing solutions in which a major overhaul, or even a new engine, may be needed when the existing fire suppression system is discharged.

The illustrative embodiments also recognize and take into account that grouping fire suppression bottles together in an array that must simultaneously discharge, or discharged in a predetermined order, is novel. Another novelty recognized by the illustrative embodiments is the small denominator bottle of the illustrative embodiments enables an MMEL (master minimum equipment list) dispatch capability via provision of one or more additional bottles beyond what is required by regulators.

In other words, the system of the illustrative embodiments would be certified with a bottle count of "N" per discharge. The airplane may then be configured with at least "N+1" bottles, such that at least one bottle is redundant. This additional redundancy enables the MMEL dispatch capability.

The illustrative embodiments also recognize and take into account that another novelty of the illustrative embodiments is the separation of the mounting features from the fire suppression bottle. As the bottle is fabricated as a smooth sphere with no mounting lugs, the mounting provisions are separated completely into a structural clamping mount. The design of the mount is then independent of the pressure vessel of the bottle. The design enables rapid development of alternate mounting schemes for the various places on the airplane where the bottle may be mounted.

Accordingly, the illustrative embodiments are able to accommodate significant spatial constraints within an aircraft or another platform. Additionally, this bottle design maximizes the flexibility for mounting. This design also minimizes the qualification testing required, because the mounting scheme is flexible enough to mount anywhere on a platform. Thus, the illustrative embodiments may be qualified for use by regulators in the harshest environment possible.

The illustrative embodiments also recognize and take into account that alternative materials to halon are typically less effective, require more of the agent, and are less dense, and thus require two times or more additional space to store within bottles. Thus, it is not practical to simply replace an existing bottle of halon gas with a bottle filled with an alternative fire suppressant material.

The illustrative embodiments address this issue by grouping together multiple small bottles of a universal size. Using bottles of a single size for all aircraft types and sizes provides for cost efficient and tooling efficient manufacturing of the fire suppressant systems of the illustrative embodiments. Additionally, existing aircraft engines or other parts of the aircraft may be more easily retrofitted because multiple smaller bottles may be grouped together to provide the same or better fire suppressant capability, without using halon gasses, even when alternatives to halon gasses require more overall volume relative to sufficient quantities of halon gasses. Further yet, by using multiple smaller bottles, the illustrative embodiments are more likely to be able to be installed closer to the engine fire zone, which in turn reduces the amount of agent required by reducing the tubing volume between the bottle location and the discharge location.

The illustrative embodiments may be characterized as "common array mounting bottles engineered for reuse" (CAMBER). The bottles are mounted in an engine of an aircraft, or mounted in other platforms, and connected to common lines such that the fire extinguisher system may be more easily maintained and reused by replacing bottles instead of the lines or other parts of the fire extinguisher system. Thus, the illustrative embodiments provide for a common array mounting bottles engineered for reuse.

FIG. 1 illustrates an aircraft, in accordance with an illustrative embodiment. In this illustrative example, aircraft 100 has wing 102 and wing 104 attached to body 106. Aircraft 100 includes engine 108 attached to wing 102 and engine 110 attached to wing 104. Body 106 has tail section 112. Horizontal stabilizer 114, horizontal stabilizer 116, and vertical stabilizer 118 are attached to tail section 112 of body 106.

Aircraft 100 is an example of a platform in which the fire suppression system or fire extinguisher system of the illustrative embodiments may be implemented, in accordance with an illustrative embodiment. However, the fire suppression systems of the illustrative embodiments may also be implemented on other platforms. Other platforms include, but are not limited to other types of vehicles such as automobiles, boats, ships, helicopters, and tanks, and also non-vehicle platforms such as buildings. Thus, the examples provided herein with respect to aircraft do not necessarily limit the claimed inventions.

Figure 2:
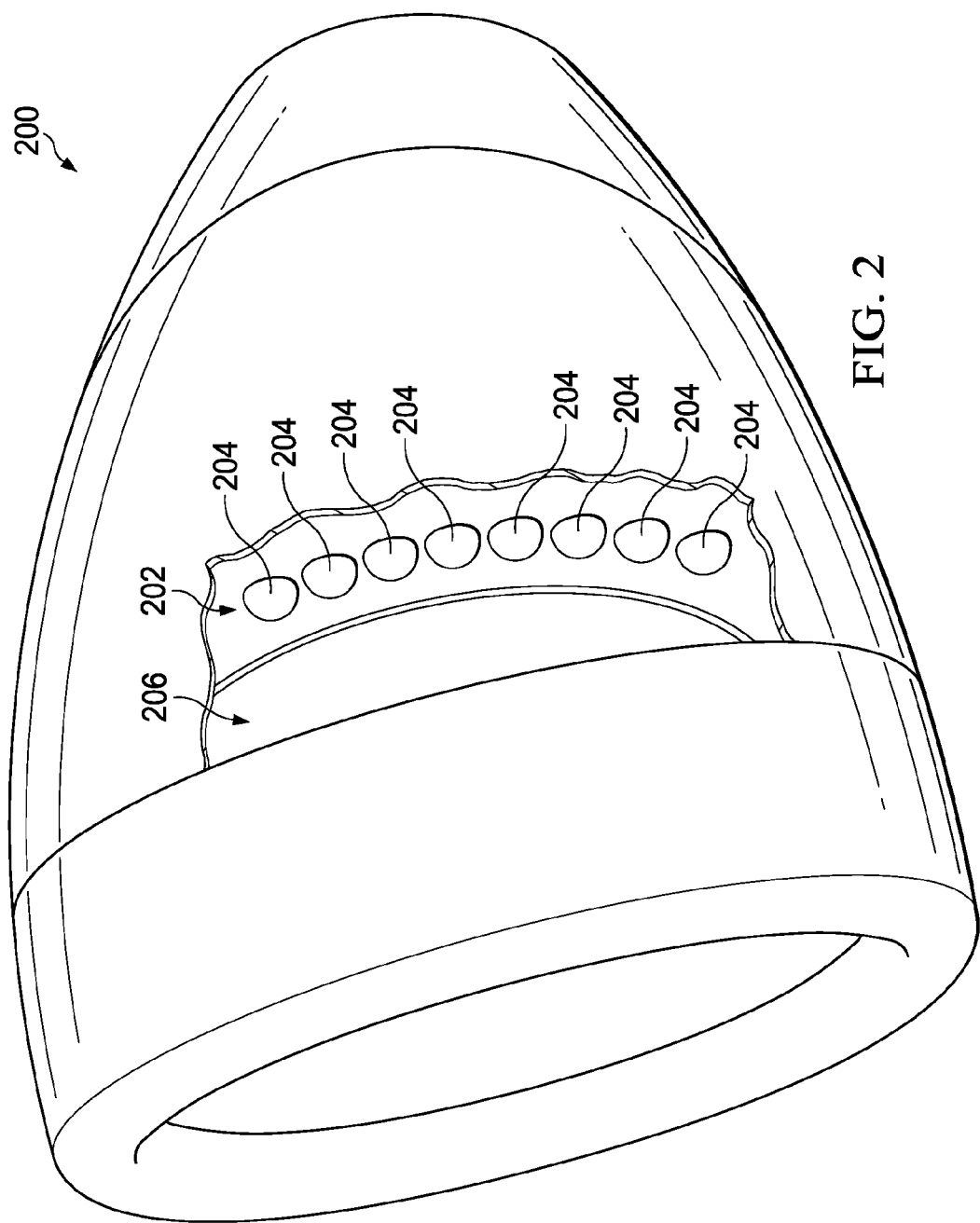
FIG. 2 illustrates an aircraft engine with a fire suppression system, in accordance with an illustrative embodiment.

FIG. 2 illustrates an aircraft engine with a fire suppression system, in accordance with an illustrative embodiment. Engine 200 may be engine 108 or engine 110 of FIG. 1.

Engine 200 is shown with fire suppression system 202. Fire suppression system 202 includes multiple bottles 204, each of which is filled with a non-halon fire suppressant material. Each bottle is grouped together with the other bottles such that all may be discharged simultaneously, or in a predetermined order, into a common line. The combined fire suppressant material ultimately is discharged into a fire suppression zone, which in this illustrative embodiment is the fan zone, which is the entire area inside space 206.

The illustrative embodiments shown in FIG. 2 do not necessarily limit the claimed inventions. For example, more or fewer bottles may be present, though at least two bottles should be present. Additionally, multiple bottles 204 may be placed in different areas of engine 200, and are not necessarily in the engine inlet area of engine 200, and not necessarily in a line, as shown.

Figure 3:
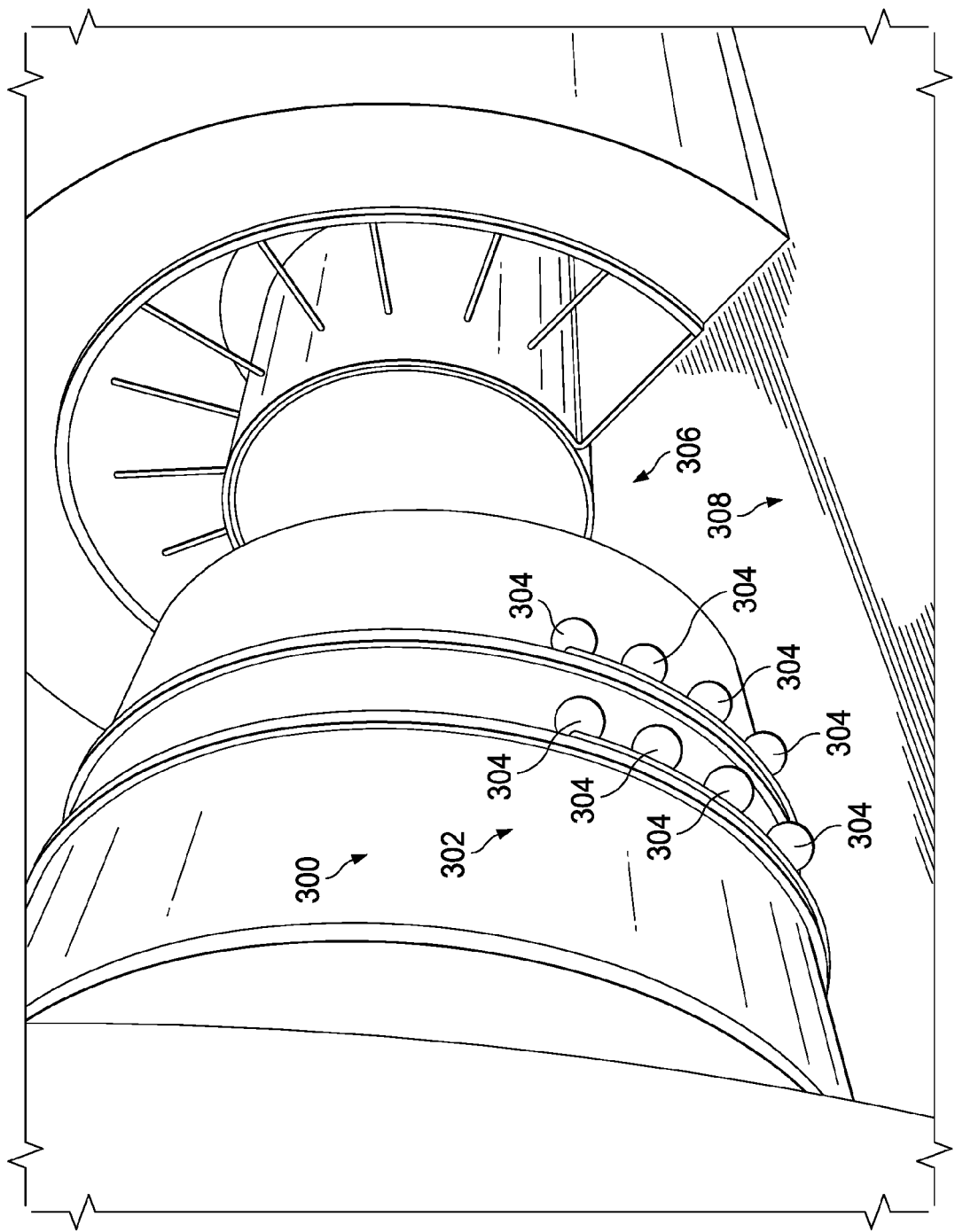
FIG. 3 illustrates another aircraft engine with a fire suppression system, in accordance with an illustrative embodiment.

FIG. 3 illustrates another aircraft engine with a fire suppression system, in accordance with an illustrative embodiment. Engine 300 may be an example of engine 108 and engine 110 shown in FIG. 1. Engine 300 may be a variation of engine 200 shown in FIG. 2. Fire suppression system 302 may be an alternative to fire suppression system 202 of FIG. 2.

In this illustrative embodiment, multiple bottles 304 are arranged in two lines, but all share a common line which discharges into fire zone 306. Each of multiple bottles 304 is filled with a non-halon fire suppressant material. Multiple bottles 304 are small enough that they may fit within the existing space of engine 300, meaning that the engine may be retrofitted easily, as opposed to having to be redesigned and re-worked.

Another benefit to fire suppression system 302 is that multiple bottles 304 are located on the lower side of engine 300, relative to ground 308. Thus, technicians may more easily access multiple bottles 304 for servicing and maintenance without having to climb into higher portions of engine 300.

The illustrative embodiments shown in FIG. 3 do not necessarily limit the claimed inventions. For example, more or fewer bottles may be present, though at least two bottles should be present. Additionally, multiple bottles 304 may be placed in different areas of engine 300. For example, in another illustrative embodiment, multiple bottles 304 may wrap around to the other side of engine 300, or may be placed in more or fewer rows.

Figure 4:
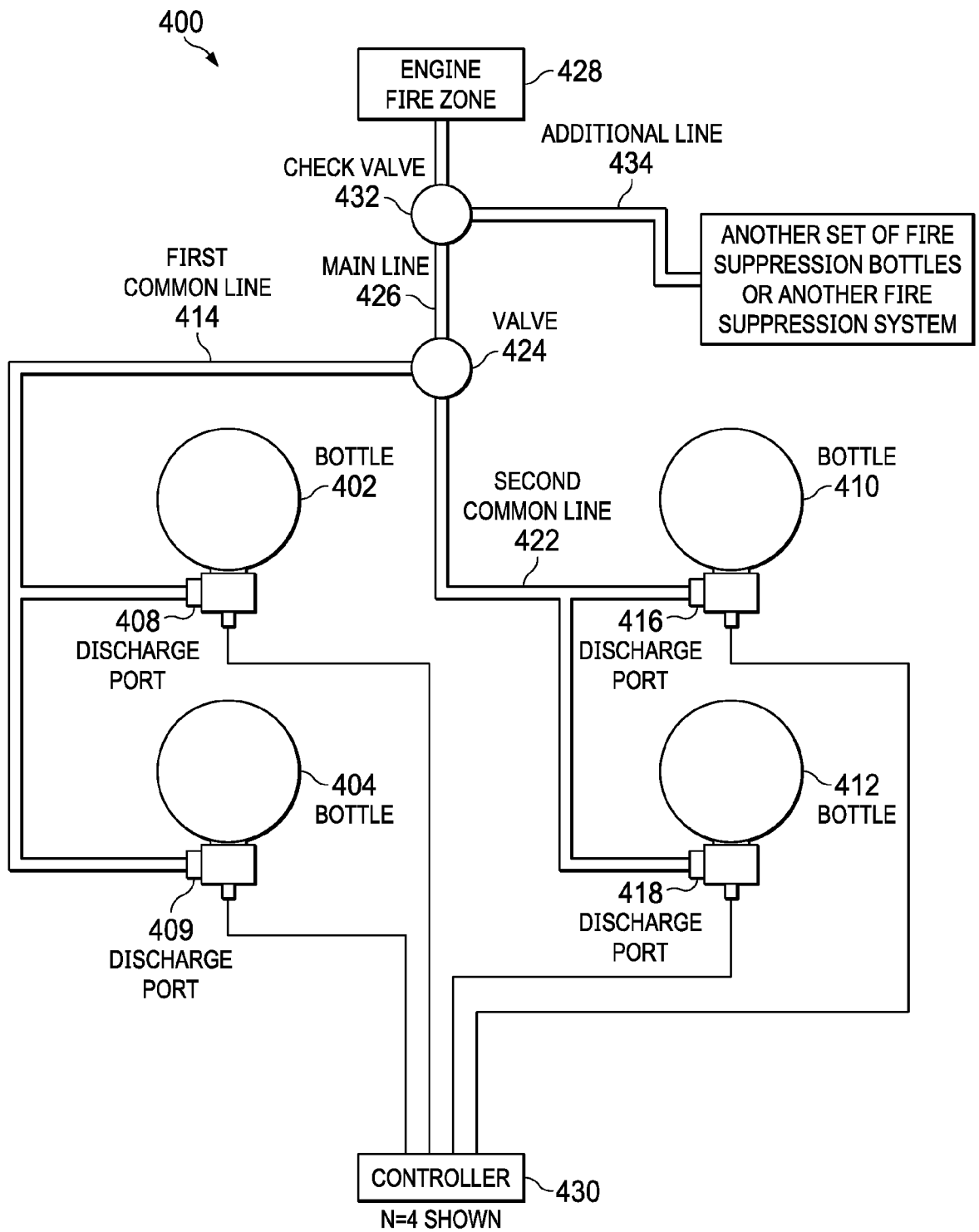
FIG. 4 illustrates a fire suppression system suitable for use in an aircraft or other platforms, in accordance with an illustrative embodiment.

FIG. 4 illustrates a fire suppression system suitable for use in an aircraft or other platforms, in accordance with an illustrative embodiment. Fire suppression system 400 may be an example of fire suppression system 202 of FIG. 2 or fire suppression system 302 of FIG. 3. FIG. 4 through FIG. 7 show parallel circuits to each parallel bottle.

Fire suppression system 400 includes four bottles arranged in two groups. Bottle 402 and bottle 404 discharge via corresponding discharge port 408 and discharge port 410 into separate lines which are connected by first common line 414. Each of these bottles may be filled with a fire suppressant agent. Bottle 410 and bottle 412 discharge via corresponding discharge port 416 and discharge port 418 into separate lines which are connected by second common line 422.

In turn, first common line 414 and second common line 422 feed via valve 424 into main line 426. Valve 424 may be a "T" valve or a "Y" valve, or any other suitable valve which allows the fire suppressant agent from first common line 414 and second common line 422 to enter main line 426. Valve 424 may also be a manifold for accepting and combining fluid discharge from multiple lines.

In turn, main line 426 terminates in engine fire zone 428, which may be a specified area in an aircraft engine. However, engine fire zone 428 may be any other appropriate discharge zone in other illustrative embodiments where fire suppression system 400 is placed in other types of platforms.

Fire suppression system 400 also includes controller 430. Controller 430 may be a computer or an application specific integrated circuit (ASIC) configured to control the discharge of the bottles shown in FIG. 4. Controller 430 may be configured to trigger the discharge of the bottles in a predetermined sequence, or simultaneously, or a combination thereof. For example, controller 430 could command bottle 402 and bottle 404 to discharge simultaneously, and then subsequently command bottle 410 and bottle 412 to discharge simultaneously.

Controller 430 may also be configured to minimize the amount of current drawn from a current source, such as a battery, used to actuate the discharge of the bottles shown in FIG. 4. For example, the sequence described above uses less energy than the energy required to discharge all simultaneously. In another example, each bottle may be discharged one at a time in a predetermined sequence such as bottle 404, bottle 412, bottle 402, and then bottle 410. This sequence is an example only. Bottle discharge sequences and can vary by sequence and timing, so as to optimize the performance of agent delivery to the fire zone.

The bottles shown in FIG. 4 may be discharged according to a variety of methods. For example, an electrical signal can open a valve. In another example, the electrical signal can trigger the firing of a squib. A squib is a small pyrotechnic device that when detonated produces a controlled air pressure pulse which ruptures a diaphragm on the fire bottle and allows the agent to flow from within the bottle into the compartment.

The firing circuits for the squibs may be integrated into fire handles in the flight deck, which may be in turn activated by a human pilot. A relay may be added into the circuit to enable the handle to operate at the existing current levels or lower while enabling the firing circuits for each of the bottles to obtain sufficient current. For example, the squibs may be wired to one another in parallel, in which case the current requirements are additive. In such an embodiment, controller 430 fires the squibs in sequence to reduce the current drawn by the firing circuits.

Other variations are possible. For example, check valve 432 and additional lines may be provided. A check valve is a device that isolates the discharges from each other. Specifically, the check valves of the illustrative embodiments prevent a second discharge from back-flooding from additional line 434 the empty lines and bottles from the first discharge.

Additional line 434 leads to another set of fire suppression bottles or another fire suppression system for the second discharge required by regulation. In a specific illustrative embodiment, the additional fire suppression bottles may be an identical set of bottles, such as that shown in FIG. 4.

In another example, FIG. 4 through FIG. 7 show parallel circuits from the controller to each parallel bottle. However, in another version, which would not reduce the voltage to each bottle squib, wiring would be run in a single line from the controller with parallel branches to each bottle. This version requires fewer wires to be run form the discharge panel to the cluster of bottles, and electrically divides the current going to the bottles from controller 430, while preventing failure in an individual squib branch from breaking continuity of the entire discharge circuit.

Figure 5:
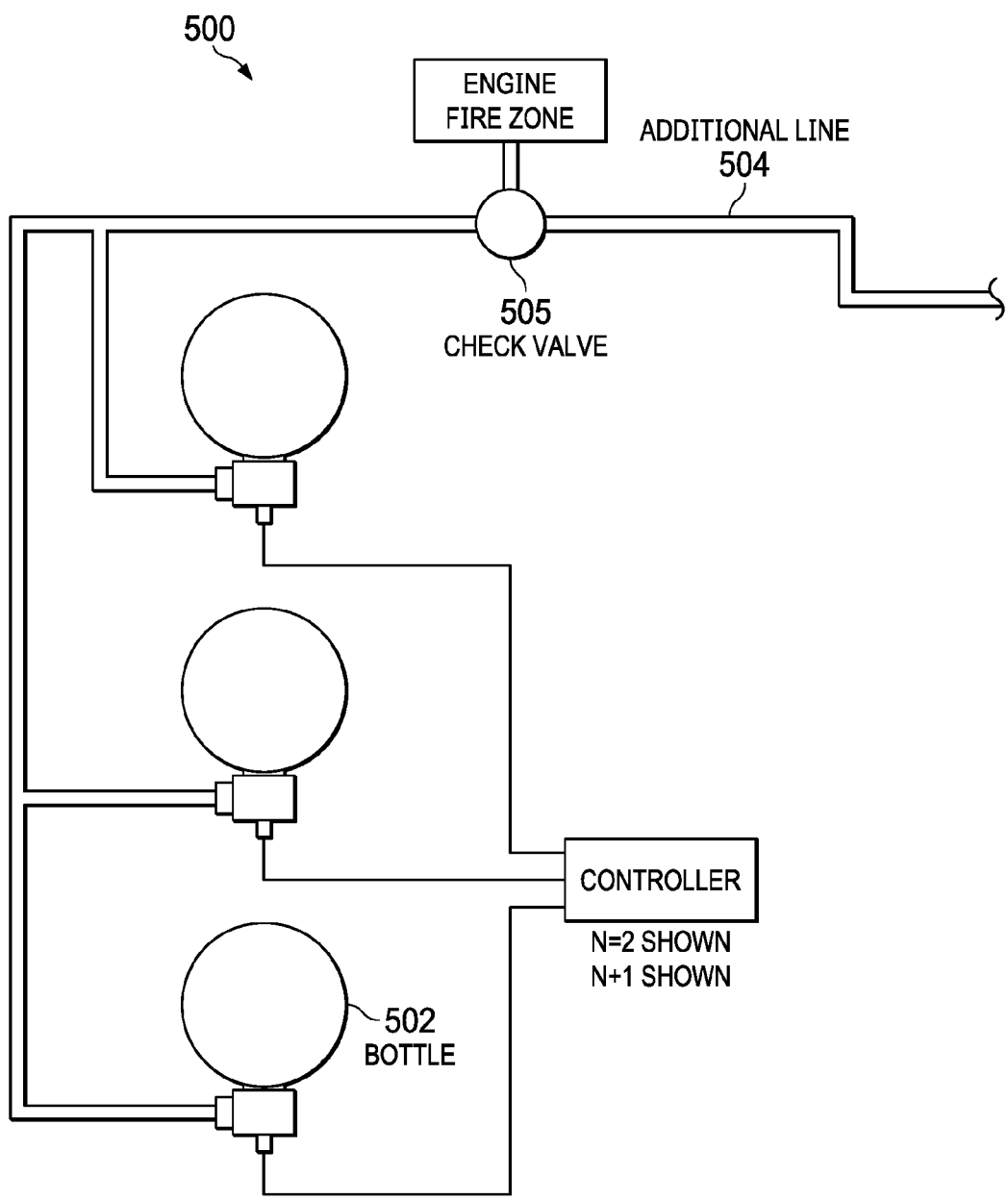
FIG. 5 illustrates another fire suppression system suitable for use in an aircraft or other platforms, in accordance with an illustrative embodiment.

FIG. 5 illustrates another fire suppression system suitable for use in an aircraft or other platforms, in accordance with an illustrative embodiment. Fire suppression system 500 is an alternative to fire suppression system 400 shown in FIG. 4. Fire suppression system 500 is nearly a duplicate of fire suppression system 400 of FIG. 4, and thus most of the features in FIG. 5 are not repeated and described here.

However, fire suppression system 500 is different than fire suppression system 400 in that fire suppression system 500 includes one additional bottle, bottle 502. This bottle is considered redundant as it is not required to meet minimum standards for a fire suppression system on a given platform, such as for example a particular type of jet engine. Thus, if "N" bottles are required to meet a given regulation for a group of bottles, fire suppression system 500 has "N+1" bottles.

The illustrative embodiments recognize and take into account that fire suppression system 400 of FIG. 4 increases the bottle count of an aircraft to meet minimum required regulations for a fire suppression system. Adding to the bottle count on board the airplane increases the probability that a failure of a bottle or an actuator may cause a flight delay. With the one-size-fits-all bottle solution of the illustrative embodiments, there is a way to reduce this possibility with a simple cost and weight trade study.

By certifying the system performance with the bottle number "N" as described, the airplane can be configured with a "N+1" bottle count for each discharge. This arrangement would make any single bottle left over redundant. On larger engines, as the bottles represent a smaller percentage of the whole agent weight, the weight would be minimized to meet a master minimum equipment list with one bottle inoperative.

This configuration may also be termed a "hot spare." Adding a "hot spare" capability to fire suppression system 400 of FIG. 4 increases dispatch reliability of the aircraft, and thus increases the availability and profit making potential of an aircraft. In one illustrative embodiment, when providing a "hot spare", the controller would not fire the spare bottle unless another bottle was detected as inoperative by the monitoring function.

In other illustrative embodiments, the small bottle size enables flyaway spares, should an aircraft operator want to take a spare bottle on the aircraft itself. Thus, for example, only one spare bottle is carried instead of the two shown in FIG. 5, which could be deployed during routine maintenance between flights. This configuration would further lower weight on the aircraft, which in turn leads to greater fuel efficiency.

Squib reliability is very high, but if there is a probability stackup that calls into question the reliability of all the squibs firing for any commanded discharge, then the "N+1" strategy would also resolve this at some impact to weight and cost. However, this configuration will still be lighter than the comparable traditional system with bottles mounted in the fuselage.

Other variations are possible. For example, more or fewer bottles may be present. In another example, additional line 504 may be provided that leads from check valve 505 to another set of fire suppression bottles or another fire suppression system for the second discharge required by regulation. In a specific illustrative embodiment, the additional fire suppression bottles may be an identical set of bottles such as that shown in FIG. 5.

Figure 6:
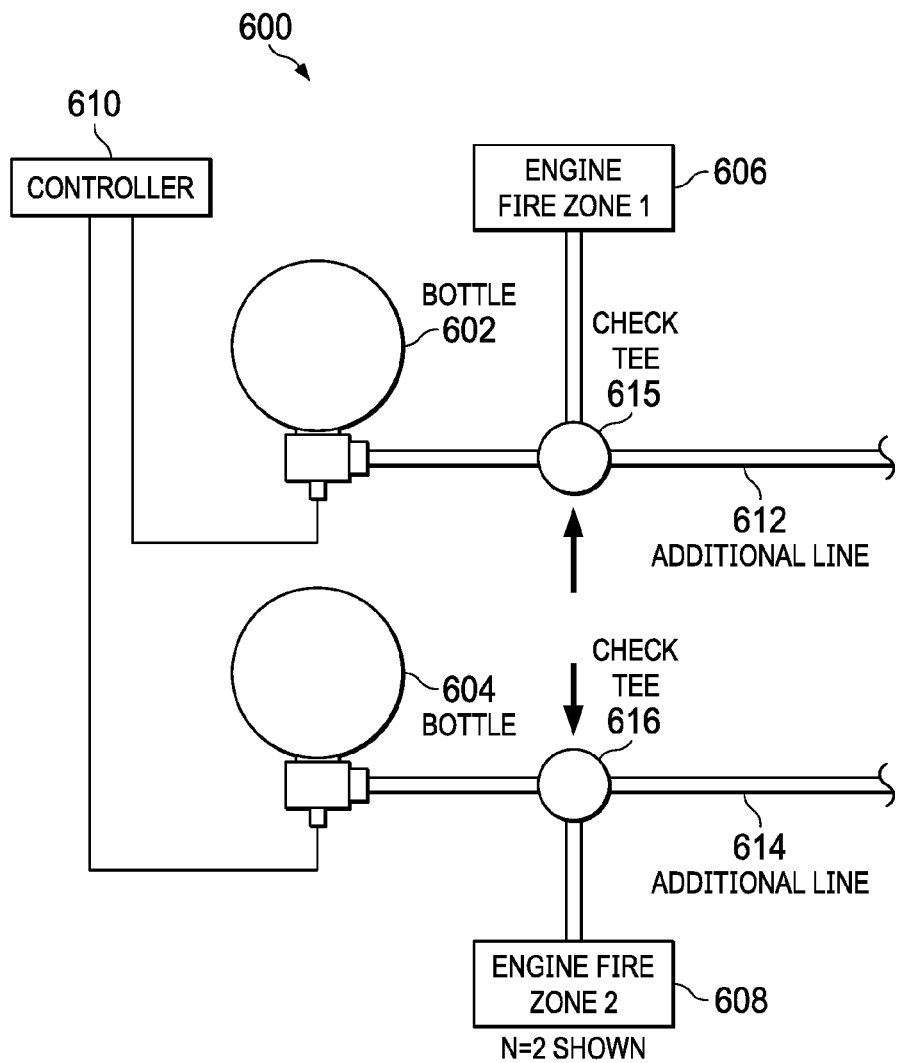
FIG. 6 illustrates another fire suppression system suitable for use in an aircraft or other platforms, in accordance with an illustrative embodiment.

FIG. 6 illustrates another fire suppression system suitable for use in an aircraft or other platforms, in accordance with an illustrative embodiment. FIG. 6 shows yet another alternative arrangement of a fire suppression system to those shown in FIG. 4 and FIG. 5. In this arrangement, bottles may be fired separately without a manifold. Thus, it is possible for certain engine configurations to fire each bottle directly into separate fire zones on the same engine without a manifold.

Fire suppression system 600 includes bottle 602 and bottle 604. Bottle 602 and bottle 604 are configured to discharge into different engine fire zones, engine fire zone 1 606 and engine fire zone 2 608. However, bottle 602 and bottle 604 are controlled by the same discharge control circuit, in controller 610. Thus, FIG. 6 represents an illustrative embodiment, wherein a single controller controls two or more bottles to discharge fire suppressant into two corresponding different engine fire zones on the same engine.

The illustrative embodiment shown in FIG. 6 may be varied. More bottles may be present. Furthermore, additional line 612 and additional line 614 could be provided which leads to other bottles beyond check tee 615 and check tee 616 for the second discharge required by regulation. Controller 610 could also control these other bottles, though a separate controller could be provided to control the discharge of these other bottles. In one illustrative embodiment, the other bottles may be arranged as a duplicate set compared to the set shown in FIG. 6.

Figure 7:
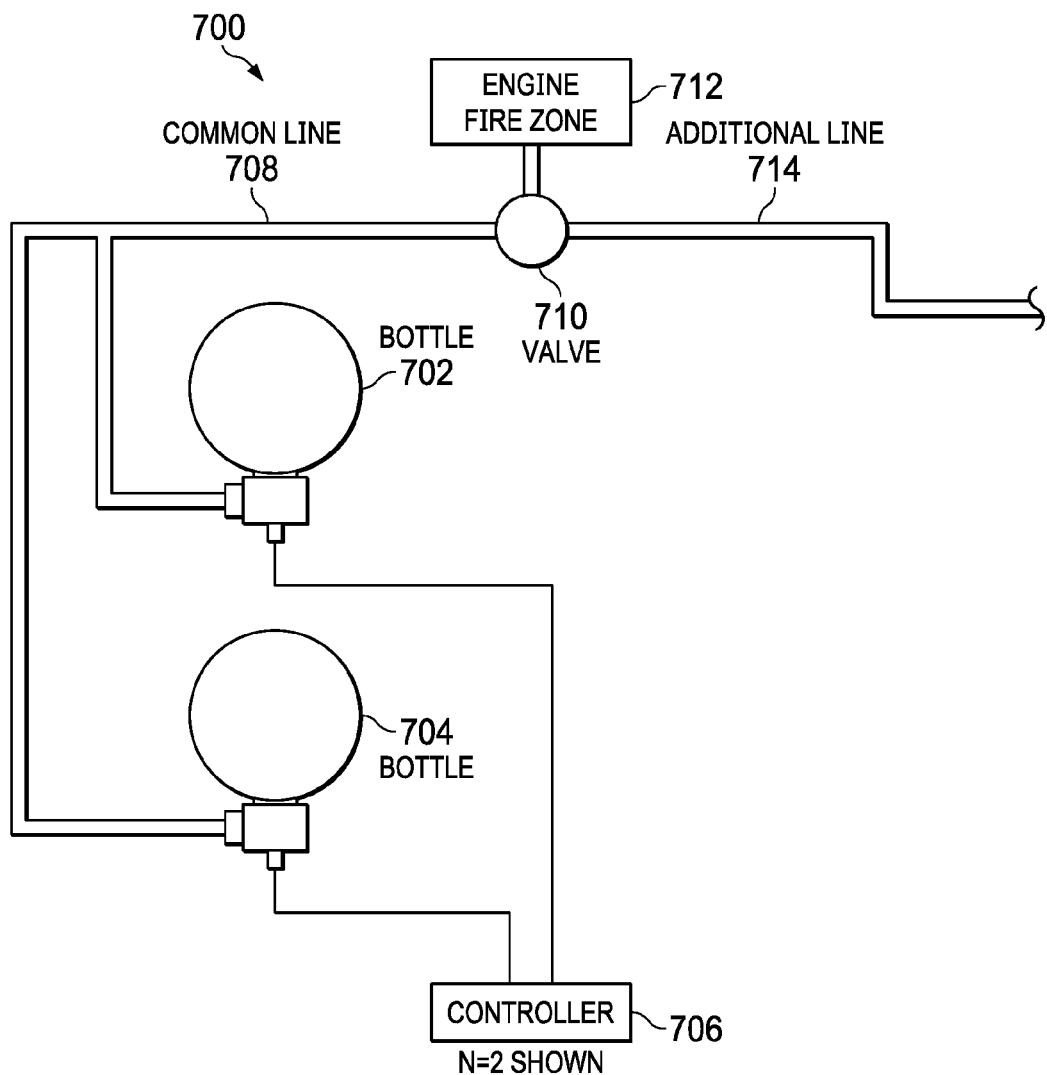
FIG. 7 illustrates another fire suppression system suitable for use in an aircraft or other platforms, in accordance with an illustrative embodiment.

FIG. 7 illustrates another fire suppression system suitable for use in an aircraft or other platforms, in accordance with an illustrative embodiment. FIG. 7 shows yet another alternative arrangement of a fire suppression system to those shown in FIG. 4 through FIG. 6. Fire suppression system 700 shows a basic implementation of the illustrative embodiments.

Fire suppression system 700 shows a minimum of two bottles in an array, including bottle 702 and bottle 704. Each of these two bottles contains a fire suppression agent, as described above. Controller 706 controls the discharge of these two bottles, which both feed into common line 708, through valve 710, and into engine fire zone 712. Controller 706 could order both bottles to discharge simultaneously, or to discharge in a predetermined sequence, as described above.

The illustrative embodiment shown in FIG. 7 may be varied. More bottles may be present. Furthermore, additional line 714 could be provided which leads to other bottles for the second discharge required by regulation. Controller 706 could also control these other bottles, though a separate controller could be provided to control discharge of these other bottles. In one illustrative embodiment, the other bottles may be arranged as a duplicate set compared to the set shown in FIG. 7.

As shown in FIG. 4 through FIG. 7, multiple configurations of grouped fire suppression bottles, variations are possible. Thus, the illustrative embodiments are not necessarily limited to those examples shown in FIG. 4 through FIG. 7.

Figure 8:
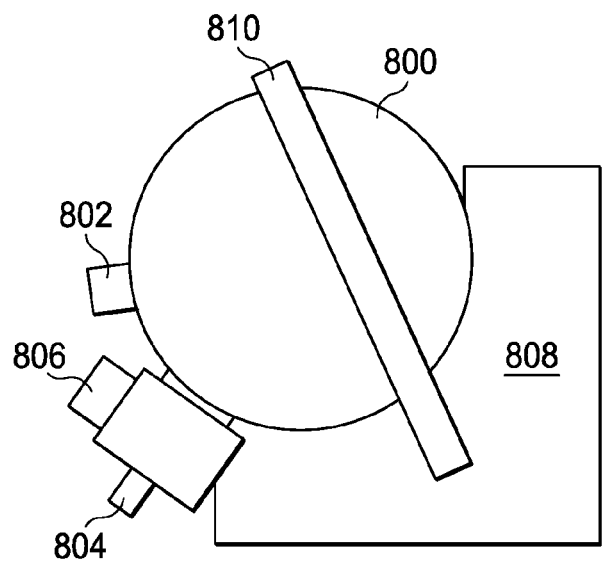
FIG. 8 illustrates a method of securing a bottle suitable for use with the fire suppression systems described herein, in accordance with an illustrative embodiment.
Figure 9:
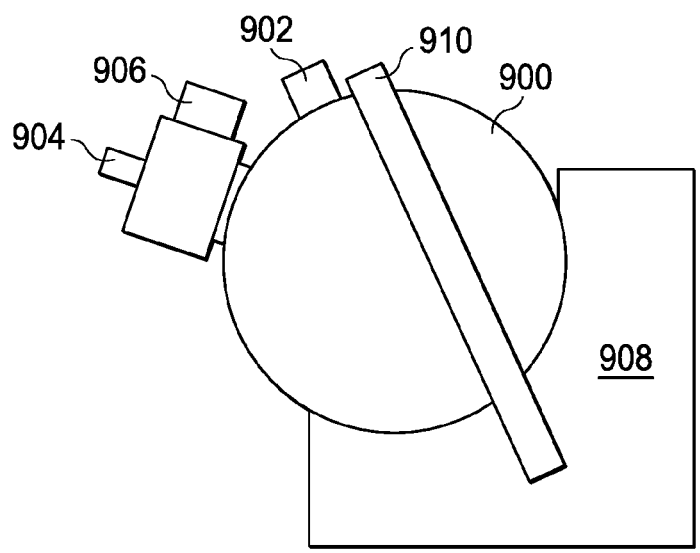
FIG. 9 illustrates another method of securing a bottle suitable for use with the fire suppression systems described herein, in accordance with an illustrative embodiment.

FIG. 8 illustrates a method of securing a bottle suitable for use with the fire suppression systems described herein, in accordance with an illustrative embodiment. FIG. 9 illustrates another method of securing a bottle suitable for use with the fire suppression systems described herein, in accordance with an illustrative embodiment. FIG. 8 and FIG. 9 are described together.

Bottle 800 and bottle 900 may be any of the bottles described with respect to FIG. 2 through FIG. 7. Bottle 800 includes monitor sensor 802 and discharge port 806 which is actuated by actuator 804. Bottle 900 includes monitor sensor 902 and discharge port 906 which is actuated by actuator 904. Again, these actuators may be squibs, valves, or other electrically or mechanically operated valves. Monitor sensor 802 and monitor sensor 902 are sensors for receiving electrical energy or communication signals from a controller, such as controller 430 shown in FIG. 4.

In both figures, the bottle is mounted to a mount which is, in turn, connected to the desired portion in an aircraft engine or other platform. Bottle 800 is connected to mount 808 and bottle 900 is connected to mount 908. Each mount may be fixedly or possibly movably connected to the platform. Thus, in some illustrative embodiments, the mount may translate or rotate in order to change an orientation of the corresponding discharge port. Additionally, each mount may have a shape corresponding to the shape of the bottle, such that a technician may rotate the bottle within its seat prior to being secured. In the illustrative embodiment shown in FIG. 8 and FIG. 9, each block has a concave spherical shape with a circular clamp to restrain the bottle enabling maximum flexibility in the orientation of the bottle's installation. However, other illustrative embodiments are possible, such as to conform the shape of the block to the shape of the bottle.

A variety of means may be used to secure a bottle to the mount. For example, in one illustrative embodiment, strap 810 may be used to secure bottle 800 to mount 808. Likewise, strap 910 may be used to secure bottle 900 to mount 908. The strap is either removably or fixedly attached to the mount, and then wraps tightly over the bottle. In this manner, a bottle may be quickly connected to and removed from the mount for ease of maintenance.

Note the strap allows a technician to adjust the default orientation of the discharge port of a bottle with respect to the mount. For example, bottle 800 is mounted in a first orientation with respect to mount 808, and bottle 900 is mounted in a second orientation with respect to mount 908 that is different than the first orientation. In this manner, should it be considered desirable, a technician may change an orientation of how bottles are mounted easily and efficiently to mate with the array plumbing and electrical hookups.

The primary difference between FIG. 8 and FIG. 9 is the orientation of the discharge port 806 relative to discharge port 906. The orientation shown in FIG. 8 and FIG. 9 would provide support against the reaction thrust load using attached tubing and tubing supports. In an illustrative embodiment, one or both orientations may react to thrust loads using a combination of tubing and a torsional friction load in the mount interface to the bottle.

The illustrative embodiments shown with respect to FIG. 8 and FIG. 9 may be varied. Different mounting systems may be used, such as mechanical braces, snap clamps, tension fits, or other types of mounting systems. Thus, the illustrative embodiments are not necessarily limited to the examples shown in FIG. 8 and FIG. 9.

Figure 10:
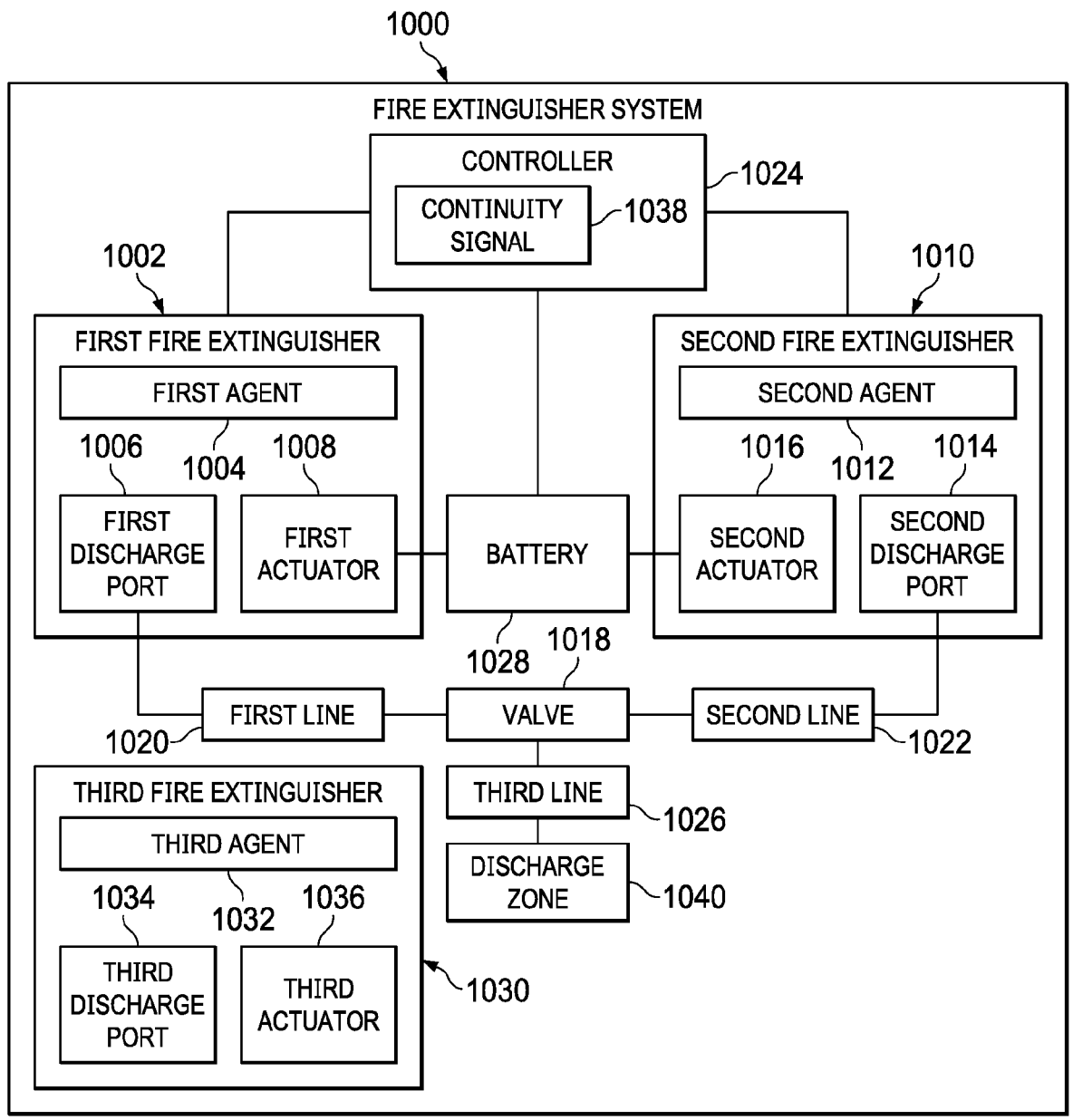
FIG. 10 illustrates a block diagram of a fire extinguisher system, in accordance with an illustrative embodiment.

FIG. 10 illustrates a block diagram of a fire extinguisher system, in accordance with an illustrative embodiment. Fire extinguisher system 1000 is a variation of the fire extinguisher systems described above with respect to FIG. 2 through FIG. 9.

Fire extinguisher system 1000 includes first fire extinguisher 1002 containing first agent 1004 that is suitable for extinguishing fire. First agent 1004 may be under pressure, or a second bottle could be provided within first fire extinguisher 1002 that serves as a propellant for first agent 1004. First fire extinguisher 1002 has first discharge port 1006 for discharging first agent 1004 therethrough, and first actuator 1008 for actuating first discharge port 1006.

Fire extinguisher system 1000 also includes second fire extinguisher 1010 containing second agent 1012 that is suitable for extinguishing fire. Second agent 1012 may be under pressure, or a second bottle could be provided within second fire extinguisher 1010 that serves as a propellant for second agent 1012. Second fire extinguisher 1010 has second discharge port 1014 for discharging second agent 1012 therethrough, and second actuator 1016 for actuating second discharge port 1014. In certain embodiments, second agent 1012 may be the same as first agent 1004. In certain embodiments, each fire extinguisher includes the same agent.

Fire extinguisher system 1000 also includes valve 1018 coupled to first discharge port 1006 via first line 1020 and coupled to second discharge port 1014 via second line 1022. Valve 1018 is configured to release first agent 1004 and second agent 1012 into third line 1026.

Fire extinguisher system 1000 also includes controller 1024 connected to first actuator 1008 and second actuator 1016. Controller 1024 is configured to activate first actuator 1008 and second actuator 1016 in a predetermined sequence.

Fire extinguisher system 1000 may be varied. For example, first actuator 1008 may be a first squib and second actuator 1016 may be a second squib. In this case, the first squib and the second squib are electrically connected to a single battery, such as battery 1028.

In another illustrative embodiment, the predetermined sequence is the first actuator and the second actuator actuating simultaneously. In another illustrative embodiment, the predetermined sequence is the first actuator and the second actuator actuating at separate times in a predetermined order.

Additional variations are possible. For example, fire extinguisher system 1000 may also include third fire extinguisher 1030 containing third agent 1032 under pressure that is suitable for extinguishing fire. Third fire extinguisher 1030 has third discharge port 1034 for discharging third agent 1032 therethrough, and third actuator 1036 for actuating third discharge port 1034. In this case, third fire extinguisher 1030 is configured as a spare fire extinguisher in fire extinguisher system 1000.

In another illustrative embodiment, controller 1024 is further configured to provide continuity signal 1038. Controller 1024 monitors continuity signal 1038 to detect an electrical disconnect between controller 1024 and any of first fire extinguisher 1002 and second fire extinguisher 1010.

In another illustrative embodiment, third line 1026 terminates at discharge zone 1040. In still another illustrative embodiment, first fire extinguisher 1002 and second fire extinguisher 1010 are a first extinguisher set. In this case, third line 1026 connects to a joining fitting that connects to a common line that terminates at discharge zone 1040. The joining fitting may be a valve, but could also be a manifold or simply a connection between multiple lines. In this case, fire extinguisher system 1000 further includes a second extinguisher set. The second extinguisher set includes a third fire extinguisher containing a third agent under pressure that is suitable for extinguishing fire, the third fire extinguisher having a third discharge port for discharging the third agent therethrough and a third actuator for actuating the third discharge port. The second extinguisher set also includes a fourth fire extinguisher (not shown) containing a fourth agent under pressure that is suitable for extinguishing fire, the fourth fire extinguisher having a fourth discharge port for discharging the fourth agent therethrough and a fourth actuator for actuating the fourth discharge port. In this illustrative embodiment, the controller is further connected to the third actuator and the fourth actuator, the controller configured to activate the first actuator, the second actuator, the third actuator, and the fourth actuator in a second predetermined sequence.

The second extinguisher may also include a second valve coupled to the third discharge port via a third line and coupled to the fourth discharge port via a fourth line. In this case, the second valve is configured to release the third agent and the fourth agent into a fifth line. Additionally, the fifth line connects to the common line via the joining fitting.

Still additional variations are possible. For example, in the above illustrative embodiment, the common line may terminate at discharge zone 1040. In another illustrative embodiment, the first actuator is a first squib, the second actuator is a second squib, the third actuator is a third squib, and the fourth actuator is a fourth squib.

Further yet, the first squib, the second squib, the third squib, and the fourth squib are electrically connected to a single battery, such as battery 1028. Additionally, the controller may be further configured to provide a continuity signal that the controller monitors to detect an electrical disconnect between the controller and any of the first fire extinguisher, the second fire extinguisher, the third fire extinguisher, and the fourth fire extinguisher.

Still other variations are possible. More or fewer blocks may be present, and different arrangements between the components of fire extinguisher system 1000 are possible. Thus, the illustrative embodiments are not necessarily limited to the example of FIG. 10.

Figure 11:
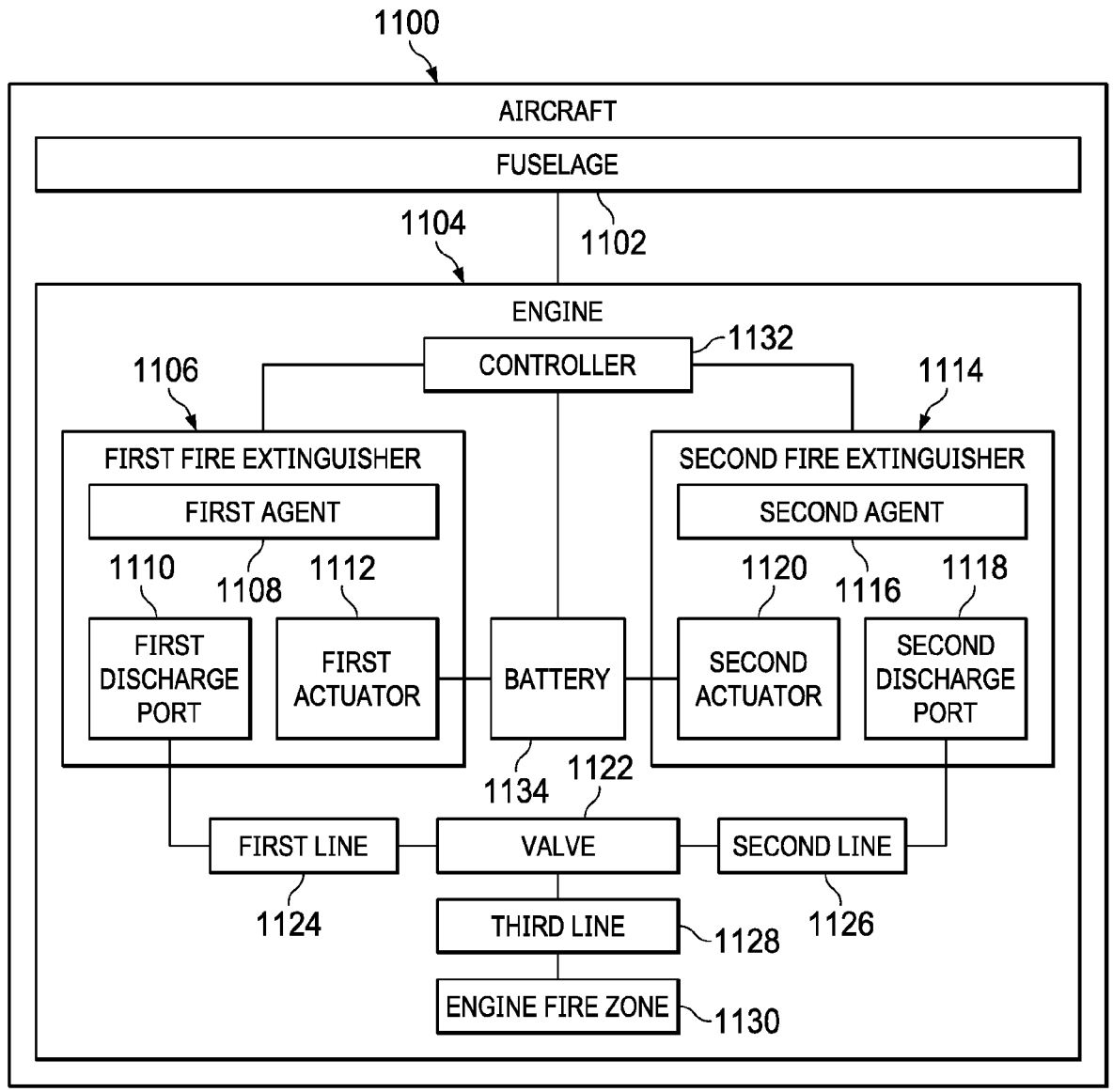
FIG. 11 illustrates a block diagram of an aircraft, in accordance with an illustrative embodiment.

FIG. 11 illustrates a block diagram of an aircraft, in accordance with an illustrative embodiment. Aircraft 1100 may be a variation of aircraft 100 of FIG. 1.

Aircraft 1100 includes fuselage 1102 and engine 1104 connected to fuselage 1102. Engine 1104 is configured to propel fuselage 1102.

Engine 1104 includes first fire extinguisher 1106 containing first agent 1108 under pressure that is suitable for extinguishing fire. First fire extinguisher 1106 has first discharge port 1110 for discharging first agent 1108 therethrough, and first actuator 1112 for actuating first discharge port 1110.

Engine 1104 also includes second fire extinguisher 1114 containing second agent 1116 under pressure that is suitable for extinguishing fire. Second fire extinguisher 1114 has second discharge port 1118 for discharging second agent 1116 therethrough, and second actuator 1120 for actuating second discharge port 1118.

Engine 1104 also includes valve 1122 coupled to first discharge port 1110 via first line 1124 and coupled to second discharge port 1118 via second line 1126. Valve 1122 is configured to release first agent 1108 and second agent 1116 into third line 1128 which terminates in engine fire zone 1130 within engine 1104.

Engine 1104 also includes controller 1132 connected to first actuator 1112 and second actuator 1120. Controller 1132 is configured to activate first actuator 1112 and second actuator 1120 in a predetermined sequence.

Aircraft 1100 may be varied. For example, first actuator 1112 may be a first squib and second actuator 1120 may be a second squib. In this case, the first squib and the second squib are electrically connected to single battery, such as battery 1134. In another illustrative embodiment, controller 1132 may be further configured to provide a continuity signal that controller 1132 monitors to detect an electrical disconnect between controller 1132 and any of first fire extinguisher 1106 and second fire extinguisher 1114.

Still other variations are possible. More or fewer blocks may be present, and different arrangements between the components of aircraft 1100 are possible. Thus, the illustrative embodiments are not necessarily limited to the example of FIG. 11.

Figure 12:
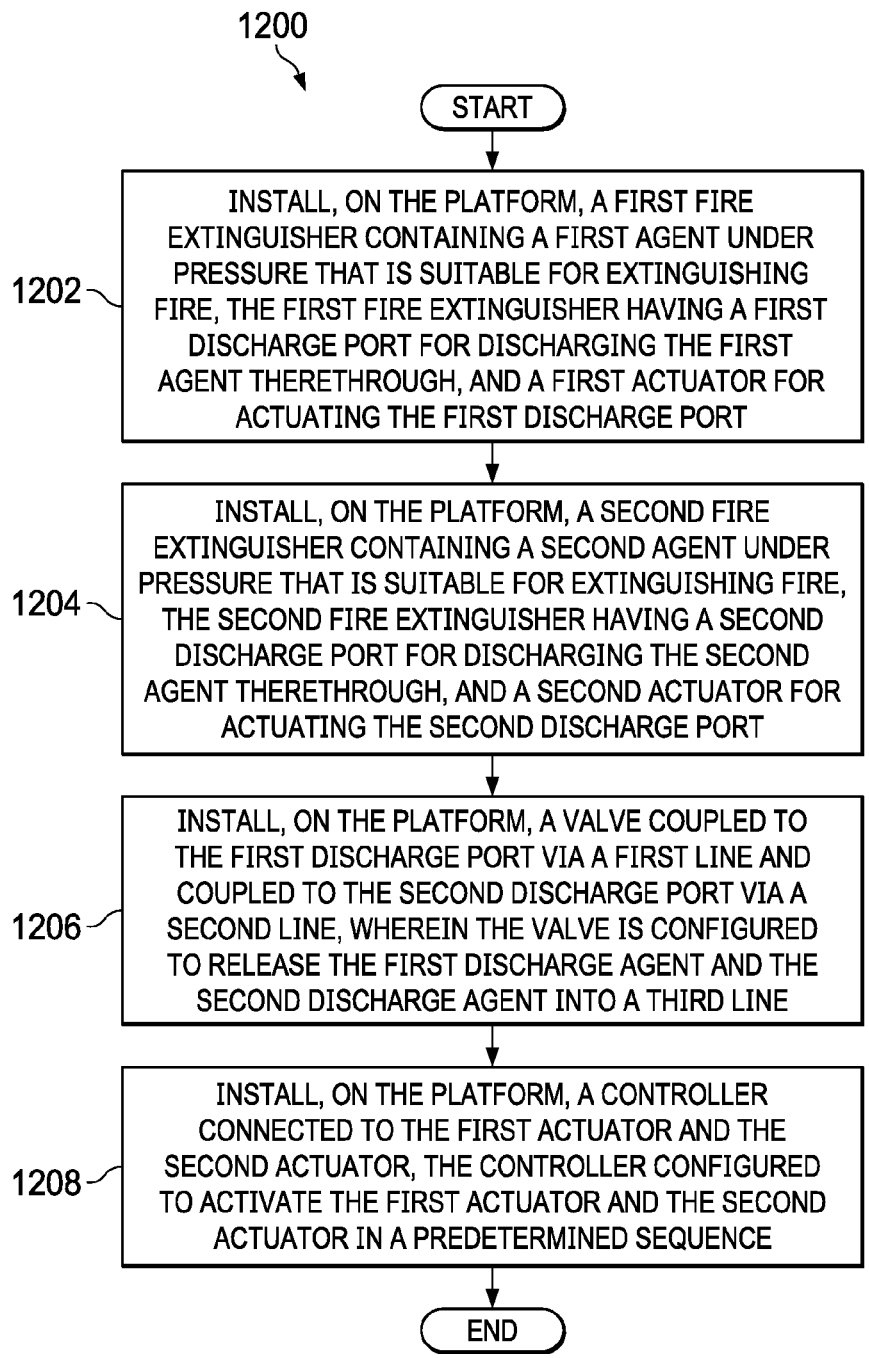
FIG. 12 illustrates a flowchart of a method of installing a fire extinguisher system on a platform, in accordance with an illustrative embodiment.

FIG. 12 illustrates a flowchart of a method of installing a fire extinguisher system on a platform, in accordance with an illustrative embodiment. Method 1200 may be implemented in a fire extinguisher system, such as those described with respect to FIG. 2 through FIG. 11. Method 1200 may be characterized as a fire extinguisher system on a platform.

Method 1200 may include installing, on the platform, a first fire extinguisher containing a first agent under pressure that is suitable for extinguishing fire, the first fire extinguisher having a first discharge port for discharging the first agent therethrough, and a first actuator for actuating the first discharge port (operation 1202). Method 1200 may also include installing, on the platform, a second fire extinguisher containing a second agent under pressure that is suitable for extinguishing fire, the second fire extinguisher having a second discharge port for discharging the second agent therethrough, and a second actuator for actuating the second discharge port (operation 1204).

Method 1200 may also include installing, on the platform, a valve coupled to the first discharge port via a first line and coupled to the second discharge port via a second line, wherein the valve is configured to release the first agent and the second agent into a third line (operation 1206). Method 1200 may also include installing, on the platform, a controller connected to the first actuator and the second actuator, the controller configured to activate the first actuator and the second actuator in a predetermined sequence (operation 1208). In one illustrative embodiment, the method may terminate thereafter.

Method 1200 may be varied. For example, the first actuator may be a first squib and the second actuator may be a second squib. In this case, the first squib and the second squib are electrically connected to a single battery. In another illustrative embodiment, the controller is further configured to provide a continuity signal that the controller monitors to detect an electrical disconnect between the controller and any of the first fire extinguisher and the second fire extinguisher.

In still another illustrative embodiment, the first fire extinguisher and the second fire extinguisher comprise a first extinguisher set, and the third line connects to a joining fitting that connects to a common line that terminates at a discharge zone. In this case, the method further includes installing, on the platform, a second extinguisher set. The second extinguisher set includes a third fire extinguisher containing a third agent under pressure that is suitable for extinguishing fire, the third fire extinguisher having a third discharge port for discharging the third agent therethrough, and a third actuator for actuating the third discharge port. The second extinguisher set also includes a fourth fire extinguisher containing a fourth agent under pressure that is suitable for extinguishing fire, the fourth fire extinguisher having a fourth discharge port for discharging the fourth agent therethrough, and a fourth actuator for actuating the fourth discharge port. In this illustrative embodiment, the controller is further connected to the third actuator and the fourth actuator, the controller configured to activate the first actuator, the second actuator, the third actuator, and the fourth actuator in a second predetermined sequence.

The second extinguisher set also may include a second valve coupled to the third discharge port via a third line and coupled to the fourth discharge port via a fourth line. The second valve is configured to release the third agent and the fourth agent into a fifth line. The fifth line connects to the common line via the joining fitting. The common line terminates at a discharge zone.

Further variations are also possible. More or fewer operations may be present, and the operations described above may be further varied. Therefore, the example provided by method 1200 does not necessarily limit the claimed inventions.

Figure 13:
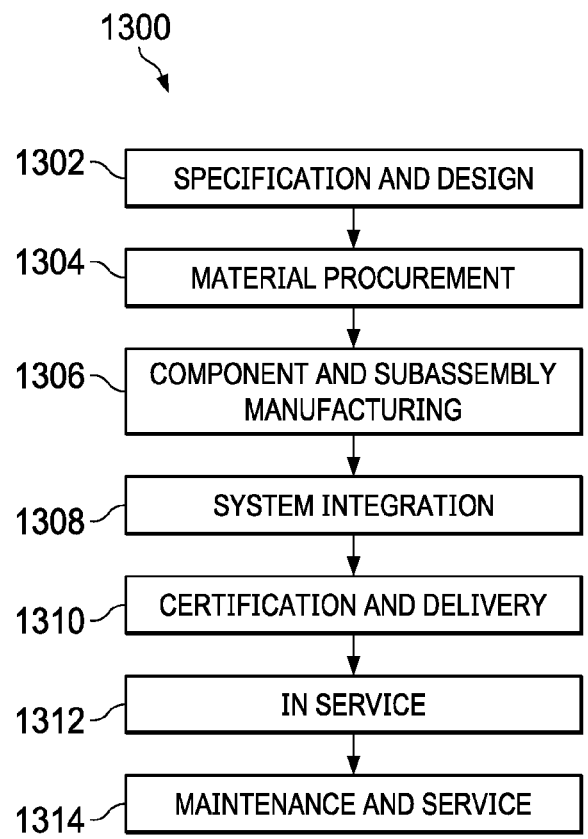
FIG. 13 illustrates an aircraft manufacturing and service method, in accordance with an illustrative embodiment.
Figure 14:
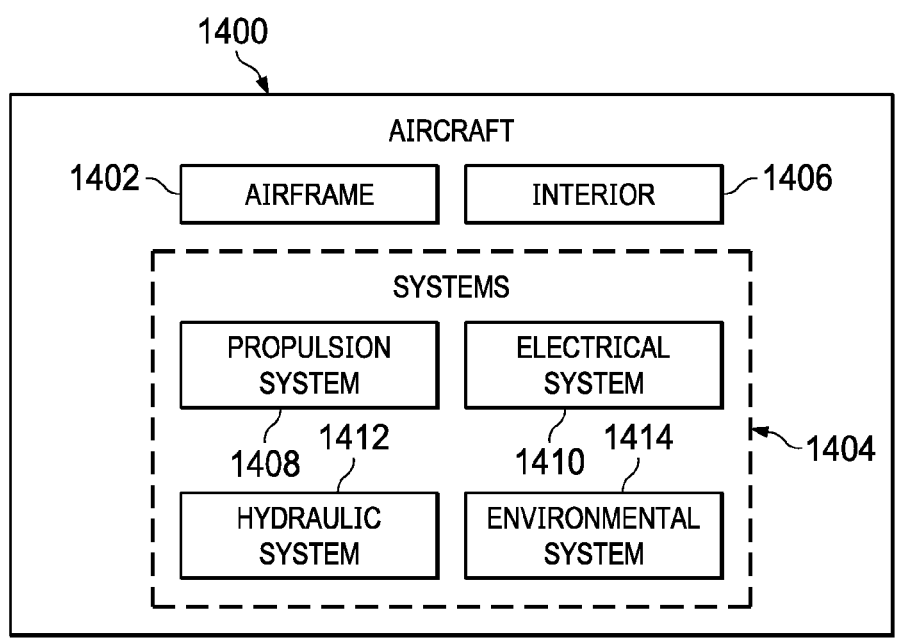
FIG. 14 illustrates a block diagram of an aircraft, in accordance with an illustrative embodiment.

Illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative embodiment. During preproduction, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Propulsion system 1408 may be engine 108 or engine 110 of FIG. 1. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. For example, aircraft 1400 may implement fire extinguisher system 1000 shown in FIG. 10.

In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312 and/or during maintenance and service 1314 in FIG. 13. The use of a number of the different illustrative embodiments may substantially expedite the assembly of and/or reduce the cost of aircraft 1400.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A fire extinguisher system in an engine of an aircraft comprising:
    a first fire extinguisher containing a first agent that is suitable for extinguishing fire, the first fire extinguisher mounted in the engine and having:
        a first discharge port for discharging the first agent therethrough; and
        a first actuator for actuating the first discharge port;
    a second fire extinguisher containing a second agent that is suitable for extinguishing fire, the second fire extinguisher mounted in the engine and having:
        a second discharge port for discharging the second agent therethrough; and
        a second actuator for actuating the second discharge port;
    a valve:
        coupled to the first discharge port via a first line; and
        coupled to the second discharge port via a second line, wherein the valve is configured to release the first agent and the second agent into a third line;
    a check valve coupled to the third line;
    a fourth line coupled to the check valve;
    an additional line coupled to the check valve, wherein the check valve prevents a discharge arriving at the check valve from the additional line from entering the third line and releases the discharge into the fourth line; and
    a controller connected to the first actuator and the second actuator, wherein the controller is configured to activate the first actuator and the second actuator in a predetermined sequence,
    wherein the first fire extinguisher and the second fire extinguisher are mounted in the engine in a line,
    wherein the first fire extinguisher and the second fire extinguisher comprise a first extinguisher set, wherein the third line connects to a joining fitting that connects to a common line that terminates at a discharge zone, and wherein the fire extinguisher system further comprises: a second extinguisher set comprising:
    a third fire extinguisher containing a third agent that is suitable for extinguishing fire, the third fire extinguisher having a third discharge port for discharging the third agent therethrough, and a third actuator for actuating the third discharge port;
    a fourth fire extinguisher containing a fourth agent that is suitable for extinguishing fire, the fourth fire extinguisher having a fourth discharge port for discharging the fourth agent therethrough and a fourth actuator for actuating the fourth discharge port; and wherein the controller is further connected to the third actuator and the fourth actuator, the controller configured to activate the first actuator, the second actuator, the third actuator, and the fourth actuator in a second predetermined sequence.

2. The fire extinguisher system of claim 1, wherein the fourth line terminates at a discharge zone.

3. The fire extinguisher system of claim 1, wherein the first actuator comprises a first squib, the second actuator comprises a second squib, the third actuator comprises a third squib, and the fourth actuator comprises a fourth squib.

4. The fire extinguisher system of claim 3, wherein the first squib, the second squib, the third squib, and the fourth squib are electrically connected to a single battery.

5. The fire extinguisher system of claim 4, wherein the controller is further configured to provide a continuity signal that the controller monitors to detect an electrical disconnect between the controller and any of the first fire extinguisher, the second fire extinguisher, the third fire extinguisher, and the fourth fire extinguisher.

6. A fire extinguisher system in an engine of an aircraft comprising:
   a first fire extinguisher containing a first agent that is suitable for extinguishing fire, the first fire extinguisher mounted in the engine and having:
      a first discharge port for discharging the first agent therethrough; and
      a first actuator for actuating the first discharge port;
   a second fire extinguisher containing a second agent that is suitable for extinguishing fire, the second fire extinguisher mounted in the engine and having:
      a second discharge port for discharging the second agent therethrough; and
      a second actuator for actuating the second discharge port;
   a valve:
      coupled to the first discharge port via a first line; and
      coupled to the second discharge port via a second line, wherein the valve is configured to release the first agent and the second agent into a third line;
   a check valve coupled to the third line;
   a fourth line coupled to the check valve;
   an additional line coupled to the check valve, wherein the check valve prevents a discharge arriving at the check valve from the additional line from entering the third line and releases the discharge into the fourth line; and
   a controller connected to the first actuator and the second actuator, wherein the controller is configured to activate the first actuator and the second actuator in a predetermined sequence,
   wherein the first fire extinguisher and the second fire extinguisher are mounted in the engine in a line,
   wherein the first fire extinguisher and the second fire extinguisher comprise a first extinguisher set, wherein the third line connects to a joining fitting that connects to a common line that terminates at a discharge zone, and wherein the fire extinguisher system further comprises: a second extinguisher set comprising:
   a third fire extinguisher containing a third agent that is suitable for extinguishing fire, the third fire extinguisher having a third discharge port for discharging the third agent therethrough, and a third actuator for actuating the third discharge port;
   a fourth fire extinguisher containing a fourth agent that is suitable for extinguishing fire, the fourth fire extinguisher having a fourth discharge port for discharging the fourth agent therethrough and a fourth actuator for actuating the fourth discharge port; and
   wherein the controller is further connected to the third actuator and the fourth actuator, the controller configured to activate the third actuator, and the fourth actuator simultaneously.

7. The fire extinguisher system of claim 6, wherein the fourth line terminates at a discharge zone.

8. The fire extinguisher system of claim 6, wherein the first actuator comprises a first squib, the second actuator comprises a second squib, the third actuator comprises a third squib, and the fourth actuator comprises a fourth squib.

9. The fire extinguisher system of claim 8, wherein the first squib, the second squib, the third squib, and the fourth squib are electrically connected to a single battery.

10. The fire extinguisher system of claim 9, wherein the controller is further configured to provide a continuity signal that the controller monitors to detect an electrical disconnect between the controller and any of the first fire extinguisher, the second fire extinguisher, the third fire extinguisher, and the fourth fire extinguisher.

11. A fire extinguisher system in an engine of an aircraft comprising:
   a first fire extinguisher containing a first agent that is suitable for extinguishing fire, the first fire extinguisher mounted in the engine and having:
      a first discharge port for discharging the first agent therethrough; and
      a first actuator for actuating the first discharge port;
   a second fire extinguisher containing a second agent that is suitable for extinguishing fire, the second fire extinguisher mounted in the engine and having:
      a second discharge port for discharging the second agent therethrough; and
      a second actuator for actuating the second discharge port;
   a valve:
      coupled to the first discharge port via a first line; and
      coupled to the second discharge port via a second line, wherein the valve is configured to release the first agent and the second agent into a third line;
   a check valve coupled to the third line;
   a fourth line coupled to the check valve;
   an additional line coupled to the check valve, wherein the check valve prevents a discharge arriving at the check valve from the additional line from entering the third line and releases the discharge into the fourth line; and
   a controller connected to the first actuator and the second actuator, wherein the controller is configured to activate the first actuator and the second actuator simultaneously,
   wherein the first fire extinguisher and the second fire extinguisher are mounted in the engine in a line,
   wherein the first fire extinguisher and the second fire extinguisher comprise a first extinguisher set, wherein the third line connects to a joining fitting that connects to a common line that terminates at a discharge zone, and wherein the fire extinguisher system further comprises: a second extinguisher set comprising:
   a third fire extinguisher containing a third agent that is suitable for extinguishing fire, the third fire extinguisher having a third discharge port for discharging the third agent therethrough, and a third actuator for actuating the third discharge port;
   a fourth fire extinguisher containing a fourth agent that is suitable for extinguishing fire, the fourth fire extinguisher having a fourth discharge port for discharging the fourth agent therethrough and a fourth actuator for actuating the fourth discharge port; and wherein the controller is further connected to the third actuator and the fourth actuator, the controller configured to activate the third actuator, and the fourth actuator in a predetermined sequence.

12. The fire extinguisher system of claim 11, wherein the fourth line terminates at a discharge zone.

13. The fire extinguisher system of claim 11, wherein the first actuator comprises a first squib, the second actuator comprises a second squib, the third actuator comprises a third squib, and the fourth actuator comprises a fourth squib.

14. The fire extinguisher system of claim 13, wherein the first squib, the second squib, the third squib, and the fourth squib are electrically connected to a single battery.

15. The fire extinguisher system of claim 14, wherein the controller is further configured to provide a continuity signal that the controller monitors to detect an electrical disconnect between the controller and any of the first fire extinguisher, the second fire extinguisher, the third fire extinguisher, and the fourth fire extinguisher.

16. A fire extinguisher system in an engine of an aircraft comprising:
a first fire extinguisher containing a first agent that is suitable for extinguishing fire, the first fire extinguisher mounted in the engine and having:
  a first discharge port for discharging the first agent therethrough; and
  a first actuator for actuating the first discharge port;
a second fire extinguisher containing a second agent that is suitable for extinguishing fire, the second fire extinguisher mounted in the engine and having:
  a second discharge port for discharging the second agent therethrough; and
  a second actuator for actuating the second discharge port;
a valve:
  coupled to the first discharge port via a first line; and
  coupled to the second discharge port via a second line, wherein the valve is configured to release the first agent and the second agent into a third line;
a check valve coupled to the third line;
a fourth line coupled to the check valve;
an additional line coupled to the check valve, wherein the check valve prevents a discharge arriving at the check valve from the additional line from entering the third line and releases the discharge into the fourth line; and
a controller connected to the first actuator and the second actuator, wherein the controller is configured to activate the first actuator and the second actuator simultaneously, wherein the first fire extinguisher and the second fire extinguisher are mounted in the engine in a line, wherein the first fire extinguisher and the second fire extinguisher comprise a first extinguisher set, wherein the third line connects to a joining fitting that connects to a common line that terminates at a discharge zone, and wherein the fire extinguisher system further comprises: a second extinguisher set comprising:
a third fire extinguisher containing a third agent that is suitable for extinguishing fire, the third fire extinguisher having a third discharge port for discharging the third agent therethrough, and a third actuator for actuating the third discharge port;
a fourth fire extinguisher containing a fourth agent that is suitable for extinguishing fire, the fourth fire extinguisher having a fourth discharge port for discharging the fourth agent therethrough and a fourth actuator for actuating the fourth discharge port; and
wherein the controller is further connected to the third actuator and the fourth actuator, the controller configured to activate the third actuator, and the fourth actuator simultaneously.

17. The fire extinguisher system of claim 16, wherein the fourth line terminates at a discharge zone.

18. The fire extinguisher system of claim 16, wherein the first actuator comprises a first squib, the second actuator comprises a second squib, the third actuator comprises a third squib, and the fourth actuator comprises a fourth squib.

19. The fire extinguisher system of claim 18, wherein the first squib, the second squib, the third squib, and the fourth squib are electrically connected to a single battery.

20. The fire extinguisher system of claim 19, wherein the controller is further configured to provide a continuity signal that the controller monitors to detect an electrical disconnect between the controller and any of the first fire extinguisher, the second fire extinguisher, the third fire extinguisher, and the fourth fire extinguisher.

* * * * *